US012678993B2

(12) United States Patent
Kalwa et al.

(10) Patent No.: US 12,678,993 B2
(45) Date of Patent: Jul. 14, 2026

(54) METHOD FOR PRODUCING A VENEERED BOARD

(71) Applicant: Flooring Technologies Ltd., Kalkara (MT)

(72) Inventors: Norbert Kalwa, Horn-Bad Meinberg (DE); Joachim Hasch, Berlin (DE)

(73) Assignee: Flooring Technologies Ltd., Kalkara (MT)

( * ) Notice: Subject to any disclaimer, the term of this patent is extended or adjusted under 35 U.S.C. 154(b) by 956 days.

(21) Appl. No.: 17/794,841

(22) PCT Filed: Jan. 11, 2021

(86) PCT No.: PCT/EP2021/050403
§ 371 (c)(1),
(2) Date: Jul. 22, 2022

(87) PCT Pub. No.: WO2021/148271
PCT Pub. Date: Jul. 29, 2021

(65) Prior Publication Data
US 2023/0347546 A1 Nov. 2, 2023

(30) Foreign Application Priority Data
Jan. 24, 2020 (EP) ..................................... 20153702

(51) Int. Cl.
| | |
|---|---|
| *B32B 21/08* | (2006.01) |
| *B27D 1/00* | (2006.01) |
| *B27D 3/00* | (2006.01) |
| *B32B 21/14* | (2006.01) |
| *B32B 27/40* | (2006.01) |
| *B32B 37/10* | (2006.01) |
| *B32B 37/12* | (2006.01) |
| *B32B 37/14* | (2006.01) |

(52) U.S. Cl.
CPC ................. *B27D 1/00* (2013.01); *B27D 3/00* (2013.01); *B32B 21/08* (2013.01); *B32B 21/14* (2013.01)

(58) Field of Classification Search
None
See application file for complete search history.

(56) References Cited

U.S. PATENT DOCUMENTS

| | | | |
|---|---|---|---|
| 9,610,757 B2 | 4/2017 | Lorenz et al. | |
| 9,957,420 B2 | 5/2018 | Morgeneyer et al. | |
| 2003/0108760 A1* | 6/2003 | Haas ........................ | B27D 1/00 |
| | | | 428/537.1 |
| 2014/0238593 A1 | 8/2014 | Morgeneyer et al. | |
| 2014/0342135 A1 | 11/2014 | Lorenz et al. | |
| 2017/0190156 A1 | 7/2017 | Lundblad et al. | |
| 2017/0305119 A1* | 10/2017 | Bergelin ................. | B32B 27/40 |
| 2019/0112500 A1 | 4/2019 | Berger et al. | |

FOREIGN PATENT DOCUMENTS

| | | |
|---|---|---|
| CN | 101121274 A | 2/2008 |
| CN | 104093801 A | 10/2014 |
| DE | 10300247 B4 | 7/2004 |
| DE | 102011085996 A1 | 5/2013 |
| DE | 102012201780 A1 | 8/2013 |
| DE | 202013012020 U1 | 2/2015 |
| EP | 2902196 A1 | 8/2015 |
| IT | 201800003227 A1 | 9/2019 |
| JP | 2000094402 A | 4/2000 |
| JP | 2010042648 A | 2/2010 |
| WO | 2014209097 A1 | 12/2014 |
| WO | 2017144760 A1 | 8/2017 |

OTHER PUBLICATIONS

International Preliminary Report on Patentability of PCT/EP2021/050403. (Year: 2022).*
International Search Report dated for PCT/EP2021/050403 dated Apr. 12, 2021.
Office Action dated Jul. 26, 2023 for corresponding Chinese Application No. 202180010295.9.

* cited by examiner

*Primary Examiner* — Michael J Feely
(74) *Attorney, Agent, or Firm* — Bachman & LaPointe, P.C.

(57) ABSTRACT

To provide a method which is intended for producing a veneered board with a simple structure that also makes it possible to improve the properties of the veneer in a simple manner, a method is proposed for producing a veneered board, wherein the veneered board comprises a veneer (4) having an upper face (6) and a lower face (5) and a carrier board (1) having an upper face (2) and a lower face (3), comprising the steps of providing a veneer (4), applying a binder (8) onto the upper face (2) of the carrier board (1) or the lower face (5) of the veneer (4), wherein a PU prepolymer is used as the binder, producing a stack of materials to be pressed comprising the carrier board (1) and the veneer (4) with the binder (8) arranged between the carrier board (1) and the veneer (4) and with the additive (7) arranged between the binder (8) and the veneer (4), pressing the stack of materials to be pressed in order to form a veneered board. The invention additionally relates to a veneered board.

12 Claims, 1 Drawing Sheet

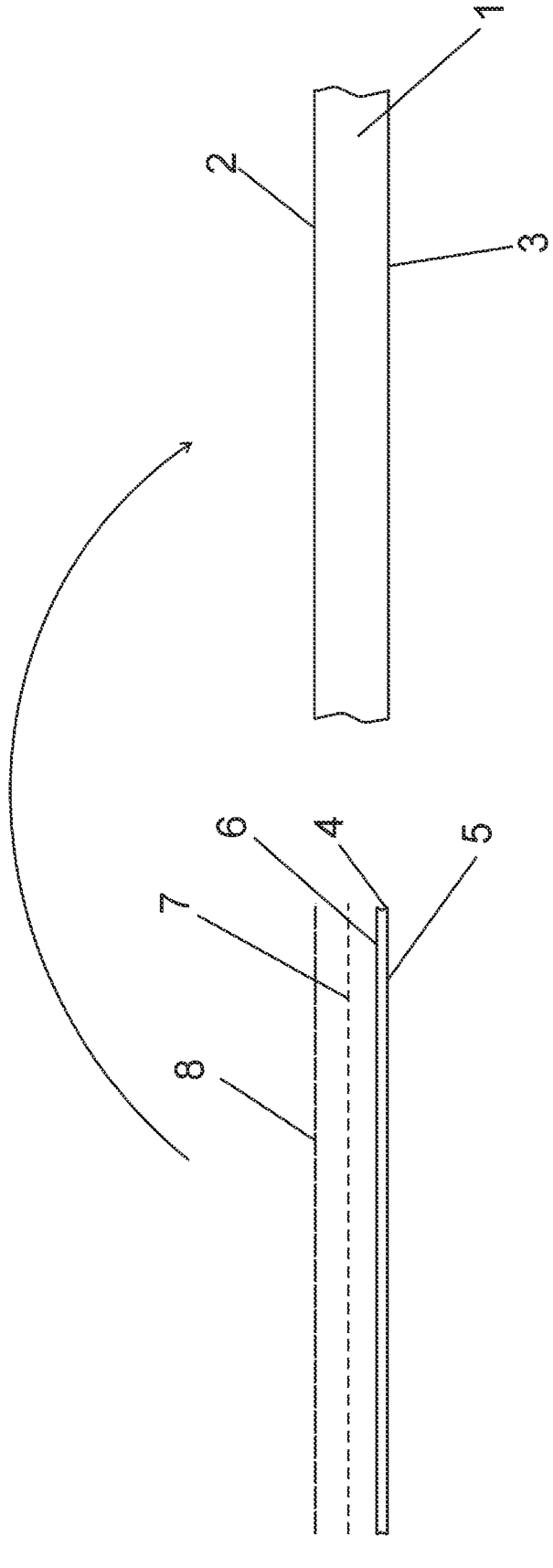

METHOD FOR PRODUCING A VENEERED BOARD

BACKGROUND OF THE INVENTION

The invention relates to a method for producing a veneered board and to a veneered board.

Veneered boards give the impression of a real wood surface, but are very economical on account of the sparing use of thin veneer layers in conjunction with a carrier board. A typical veneered board, in which the veneer is fixed on the carrier board by means of a sheet of paper impregnated with binder, is presented in EP 2 902 196 A1 and DE 103 00 347 B4. In addition, DE 10 2011 085 996 A1, IT 2018 0000 3227 A1, DE 10 2012 2017 780 A1, US 2017/190156 A1 and utility model DE 20 2013 012 020 U1 disclose similar boards.

The disadvantage of a known veneered board of this kind is that the structure of the veneered board is complex and that the properties of the veneer can only be improved to a very limited extent.

SUMMARY OF THE INVENTION

The object of the invention is therefore to provide a method for producing a veneered board with a simple structure that also makes it possible to improve the properties of the veneer in a simple manner.

This object is achieved with a method as well as a veneered board as disclosed herein.

The method according to the invention for producing a veneered board, which comprises a veneer having an upper face and a lower face and a carrier board having an upper face and a lower face, takes place with the steps of:

providing a veneer, applying a binder onto the upper face of the carrier board or the lower face of the veneer, wherein a PU prepolymer is used as the binder, producing a stack of materials to be pressed, comprising the carrier board and the veneer with the binder arranged between the carrier board and the veneer and with the additive arranged between the binder and the veneer, pressing the stack of materials to be pressed in order to form a veneered board.

The polyurethane prepolymer (PU prepolymer) used according to the invention as the binder has proven advantageous for fixing a veneer on a carrier board. As a prepolymer of isocyanates, it is easier to process than isocyanate monomers. PU prepolymers are usually produced from two diisocyanates and a diol or glycol. This creates a prepolymer having two isocyanate groups. Aliphatic (e.g. isophorone diisocyanate, 1,6-hexamethylene diisocyanate, 1,4-cyclohexyl diisocyanate, dicyclohexyl-4,4'-diisocyanate, etc.) or aromatic (toluene diisocyanate) diisocyanates can be used to produce prepolymers. In the case of diols or glycols, 1,3-propandiol or low molecular weight polyethylene glycols, respectively, are used. Despite being a prepolymer, the PU prepolymer is capable of fully and uniformly penetrating the veneer, potentially during pressing, such that the veneer with the PU prepolymer binder can bond well to a carrier board. The PU prepolymer cures substantially thermally, i.e. at an increased temperature of, for example, 100° C. to 240° C.; it is therefore a post-crosslinking polymer. During pressing, the prepolymer penetrates into the veneer, but potentially also into the carrier board or rather into the surface thereof. The binder therefore not only cures, it is also mechanically anchored between the veneer and the carrier board on account of the pressing. In this connection, it is particularly advantageous that isocyanates can react with all molecules containing OH groups (e.g. water, cellulose, hemicellulose, lignin). This means that the prepolymer chemically cross-links with the wood matrix of the veneer and the carrier material. Therefore, a polyurethane can be identified as the binder on the finished veneered board. This binder has proven to be water-resistant, and therefore a veneered board produced with a PU prepolymer has a wider range of options for use than a veneered board produced with a non-water-resistant binder. In addition, the binder according to the invention strengthens the veneer, thus improving the mechanical use properties of the veneer, in particular the compressive strength.

The PU prepolymer is transparent, but it may also be colored. At the locations where the binder may be exposed to light in the region of the surface of the veneer it is recommended that aliphatic PU prepolymers are used, that do not react or rather only react slightly when exposed to light, i.e. they remain transparent and do not discolor or rather turn yellow. At the locations where light stability or rather light fastness is not important, aromatic PU prepolymers may also be used which react more strongly under the action of light and tend to discolor.

Any board that is flat on at least one side and that forms a firm bond with the PU prepolymer or rather with the polyurethane as the cured binder may be used as the carrier board. Preferably, wood composite boards are used, e.g. medium-density or high-density fiberboards (MDF, HDF), chipboards, OSB (oriented strand boards), solid wood boards, plywood, blockboards or laminboards, but also cement-bonded chipboards or fiberboards, but also biocomposite boards, boards with a high proportion of binder, in particular boards having a proportion of binder of greater than 50 wt. % relative to the total weight of the board, boards that comprise a mixture of different fibers, e.g. natural fibers and bicomponent fibers. The carrier board has an upper face, onto which the veneer is applied, and a lower face, onto which a backing is optionally applied.

Sheets of real wood that have a thickness of up to 10 mm, preferably, however, 0.2 mm to 5 mm, in particular 0.5 mm to 3 mm, are used as veneer. The veneer may be produced in one piece from a log by means of slicing or peeling. However, it may also be composed of individual sections that, for example, are bonded with each other by means of binder or a glue thread. Generally, the veneer has a moisture content of at most 20 wt. %, preferably at most 12 wt. %, in particular at most 8 wt. %. The veneer preferably has the dimensions of the carrier board. The veneer comprises a lower face facing the carrier board and an upper face facing away from the carrier board.

The use of an additive makes it possible to set the properties of the veneered carrier board in a targeted manner. According to the invention, however, the additive is applied between the veneer and the binder, wherein the additive is introduced into the veneer by means of the binder during pressing. This approach has proven particularly suitable for achieving the desired effect with sparing use of the additive. The additive may be applied onto the surface of the binder facing the veneer, or alternatively the additive may be applied onto the veneer surface facing the binder, which is generally the lower face of the veneer. Various substances or compounds may be applied onto the binder as an additive, in each case individually or in a mixture or one after the other. According to the invention, the following are suitable as an additive, for example: a dye, a pigment, an effect pigment, e.g. metal pigments or reflective pigments, flame retardants such as ammonium phosphates or water glass, ink, a UV stabilizer, an infrared absorber, agents for increasing the conductivity, antibacterial agents, antifungal agents, antialgal agents, hydrophobizing agents, bleaching agents or stain. Of course, any other additives may also be used, depending on the required or desired property. The additive may be present as a solid, preferably as a particulate solid, e.g. as dust or powder, but also as granular material. Alternatively, a liquid or paste-like additive may be used. However, the additive may also be soluble in the binder; in this case, the additive may not be completely transported to the surface. It is a question of the dose of the additive. Binders and additives are not mixed with one another before being applied to the veneer or carrier board.

According to a development of the invention, the additive is not soluble in the binder or, alternatively, is not homogeneously soluble in the binder. In this way, it is ensured that the additive does not mix with the binder and, as result, lose effectiveness, but rather remains on the surface of the binder and, as a result, comes into contact as completely as possible with the veneer.

In a simple embodiment of the invention, the binder is applied onto the lower face of the veneer or upper face of the carrier board as explained in more detail below. According to a preferred alternative, firstly, the additive is applied onto the lower face of the veneer. Advantageously, the lower face of the veneer faces upward when the additive is applied, such that the additive lies on the lower face of the veneer. After application of the additive or after application of a mixture of additives or after successive applications of multiple additives, the additive can optionally be fixed, e.g. by means of drying or heating. For example, liquid additive, e.g. ink, can be dried. It has been shown that, in spite of the fixation of the additive, during the pressing process, when the binder is liquefied to a greater extent prior to curing and penetrates the veneer at least in portions, the additive is transported by the PU prepolymer through the veneer, so that an aesthetic effect, for example, is reliably achieved with little use of additive.

Subsequently, binder is applied onto the veneer. The binder is preferably applied in liquid form, e.g. sprayed or poured on. Typical amounts used are 40 g/m$^2$ to 400 g/m$^2$, preferably between 60 g/m$^2$ and 250 g/m$^2$, in particular between 80 g/m$^2$ and 200 g/m$^2$. If only bonding of the veneer to the carrier board is intended, an amount used of up to 100 g/m$^2$ is generally sufficient, depending on the type and thickness of the veneer. If additional penetration of the veneer is desired, an application amount of 80 g/m$^2$ to 400 g/m$^2$ is required, depending on the type and thickness of the veneer. The binder has a high solids content, generally above 80 wt. %, preferably above 90 wt. %, relative to the total weight of the prepolymer. Therefore, the prepolymer applied as the binder can hardly release liquid; generally, it cannot be dried but rather remains liquid on the surface of the veneer or, as the case may be, on the surface of the carrier board.

Therefore, after application of the binder and, if applicable, the additive, the veneer or, alternatively, the carrier board is preferably processed further immediately. If the binder is applied onto the upper face of the carrier board, the veneer is laid with its lower face on the upper face of the carrier board provided with binder for further processing. The stack of materials to be pressed is thus formed as follows: the binder lies on an upper face of the carrier board, the additive optionally lies on the binder, and the veneer lies on the additive as the outer layer. Alternatively, the veneer provided with binder on its lower face and optionally one or more additives is laid onto the upper face of the carrier board. The carrier board, the binder, optionally the additive, and the veneer are thus layered in order to form a stack of materials to be pressed.

Optionally, a backing may be arranged on the lower face of the carrier board. The backing is intended to compensate for tensile forces that are caused by the veneer on the upper face of the carrier board. The backing is generally a sheet of paper or paperboard impregnated with binder, but it could also be a veneer or another planar layer that is bonded to the lower face of the carrier board in a planar manner. However, the paper or paperboard may also be bonded on the lower face of the carrier board by means of the binder. Preferably, a backing that is comparable or similar to the layer on the upper face of the carrier board is used. Advantageously, a veneer that is coated with the binder according to the invention and optionally also with an additive is therefore used in connection with the invention.

The above-described stack of materials to be pressed is pressed into a veneered board. In the press, the PU prepolymer is cured under the action of an increased temperature, i.e. the viscosity of the binder is reduced further during heating. The PU prepolymer cures chemically during pressing to form a polyurethane and solidifies during cooling. The pressing pressure causes the binder, as long as it not has not yet cured, to penetrate into the veneer and preferably also into the surface of the carrier board. This forms the basis for good mechanical anchoring of the binder, which ensures that any restoring forces present in the veneer are dissipated or, alternatively, absorbed by the binder before the press is opened. The pressing time is typically between 20 seconds and 60 seconds. The pressing temperature is usually between 100° C. and 240° C., preferably between 160° C. and 200° C. The pressing pressure is between 25 N/mm$^2$ and 50 N/mm$^2$. During the pressing process, the liquid binder penetrates into the veneer. Unlike the more impermeable surface of the carrier board, the veneer comprises cavities, not only cracks and gaps produced during production but also cavities that are typical of wood, e.g. due to veins that have been cut into. The binder easily penetrating into the veneer causes the veneer to become firmly bonded to the carrier board. At least partial penetration of the binder into the surface of the carrier board supports bonding of the veneer and carrier board. As a result of the PU prepolymer penetrating the veneer at least in portions, and preferably completely, a veneered board is created with a water-resistant surface, since the binder is water-resistant in the cured state. Like all wood surfaces, the veneer is not water-resistant; it is impregnated by the PU prepolymer or rather by the polyurethane created during pressing, as a result of which the veneered surface is made water-resistant.

This description clearly shows that the production of the veneered board according to the invention takes place proceeding from only two components, i.e. the carrier board and the veneer coated with binder and optionally with an additive, or a veneer and a carrier board coated with the binder and optionally with an additive. As a result, the stack of materials to be pressed is particularly easy to produce. In the case of two layers, i.e. a carrier board and a veneer, one of which is coated with binder and, if applicable, an additive, there is no risk of the layers slipping or sliding relative to one another, and therefore fewer rejects will be produced during production. Nevertheless, all use properties of the veneer can be set as desired, i.e. the veneered board may be provided with a wide range of properties. The additive optionally lying on the binder in the stack of materials to be pressed is conveyed through the veneer during the pressing process substantially without mixing with the binder and can therefore exert its effect directly where required without major losses.

A further development of the invention relates to a veneered board, comprising a carrier board and a veneer arranged above the carrier board, characterized in that the veneer is impregnated at least in portions with binder, and that an additive is optionally present on the upper face of the binder in the veneer. The additive, which improves the use properties of the veneer, is predominantly located in the veneer. The binder, in this case polyurethane, is substantially free of additive.

According to further embodiment, the veneered board comprises a backing on the lower face of the carrier board. The backing may be a sheet of paper impregnated with binder or a sheet of cardboard or, alternatively, a sheet of paperboard impregnated with binder, but is preferably also in the form of veneer. The paper or cardboard may also be bonded to the lower face of the carrier board by means of the binder. The backing is pressed with the carrier board as a component of the stack of materials to be pressed and ensures that the veneered board does not warp, because approximately equal forces are now acting on both sides of the carrier board. If a veneer is used as the backing, it may also be provided with a binder and optionally an additive in the same way as described above for the veneer on the upper face of the carrier board.

Any board that has a flat surface may be used as the carrier board. Preferably, the carrier board is a wood composite board or a biocomposite board, as described above.

Details of the invention are explained in greater detail using exemplary embodiments.

BRIEF DESCRIPTION OF THE DRAWINGS

In the drawings:

FIG. 1 is a schematic representation of a stack of materials to be pressed provided with the binder according to the invention.

DETAILED DESCRIPTION

The components of the veneered board are a carrier board 1 having an upper face 2 and a lower face 3. Furthermore, a veneer 4 with a lower face 5 and an upper face 6 is a component of the veneered board. The carrier board 1 or, alternatively, the veneer 4 is prepared before a stack of materials to be pressed is built up in layers. This is done either by arranging the lower face 5 of the veneer facing upside. Optionally, an additive 7 is firstly applied onto the lower face of the veneer 4. Alternatively, a mixture of additives may be applied or multiple additives are applied in succession. Once the additive or, alternatively, additives 7 have been applied, a layer of binder 8 is applied. A PU prepolymer is used here as the binder. The binder 8 is used in liquid form. The binder 8 is applied in liquid form by means of a roller or a pouring machine. Alternatively, the binder according to the invention is applied onto the upper face 2 of the carrier board 1.

The further production of a veneered board takes place in that the lower face 5 of the veneer 4 is laid on the upper face 2 of a carrier board, preferably without intermediate drying, whereby a stack of materials to be pressed is layered in which the binder 8 according to the invention is arranged between the carrier board 1 and the veneer 4. The stack of materials to be pressed is pressed in a press in order to form a veneered board. Optionally, the stack of materials to be pressed is supplemented by a backing, which is applied onto the lower face 3 of the carrier board 1 and which then forms the lower face of the veneered board 1. According to an advantageous embodiment, the backing is designed in the same manner as the veneer 4 on the upper face of the carrier board. However, in principle, any coating on the lower face of the carrier board is suitable as the backing that at least partially absorbs the forces that are exerted by the veneer 4 arranged on the upper face 2 of the carrier board 1.

Exemplary Embodiment 1

Starting Materials:
  Veneer: Thickness: 0.8 mm
    Type: Oak
    This veneer is used on the upper face 2 of the carrier board 1.
  Binder: Aliphatic PU prepolymer in liquid form
    This binder is used between the upper face 2 of the carrier board 1 and the oak veneer. The binder is exposed to light after the veneered carrier board has been produced.
  Carrier board: Thickness: 10 mm
    Type: HDF (high-density fiberboard)
  Binder: Aromatic PU prepolymer 678.05 (manufacturer: Jowat) in liquid form
    This binder is used between the lower face 3 of the carrier board 1 and the birch veneer used as the backing.
  Veneer: Thickness: 1.05 mm
    Type: Birch
    This veneer is used on the lower face 3 of the carrier board 1.

Production of the Veneered Carrier Board:

100 g/m$^2$ of PU prepolymer with the product name 678.05 from the company Jowat is applied onto the carrier board, in this case a HDF board (high-density fiberboard) with the format 2800×2070×10 mm (length×width×thickness). Said PU prepolymer was produced based on aromatic isocyanates and alcohol, which were reacted to form a prepolymer. The PU prepolymer is liquid. The solids content is approx. 90 wt. % relative to the total weight of the PU prepolymer. The viscosity is approximately 65 mPas (20° C., Brookfield). The PU prepolymer is applied by means of a pouring machine. Then, the PU prepolymer is applied onto the birch veneer. The birch veneer, which is to be fixed to the lower face 3 of the carrier board 1, is laid underneath the lower face 3 of the carrier board provided with binder and thus layered in order to form a stack of materials to be pressed. The stack of materials to be pressed is pressed in a short-cycle press (SC press). The pressing conditions of the SC press are set as follows: pressing temperature 180° C., pressure 40 kg/cm$^2$ and pressing time 60 seconds. The pressing temperature ensures the curing of the binder during the pressing time and the pressing pressure causes compression of the veneer while the PU prepolymer simultaneously penetrates in.

Then, the SC press is opened and the HDF board covered on one side cools. The carrier board 1 covered on one side on the lower face 3 is turned and 200 g/m$^2$ of prepolymer based on aliphatic isocyanates is applied onto the upper face 2 of the carrier board 1. Then, the oak veneer is laid on and this stack of materials to be pressed is in turn pressed with the above-mentioned parameters. In this case, too, curing of the binder under the action of heat, penetration of the binder into the veneer and as well as compression of the veneer under the action of the pressing pressure take place. The board, which is now veneered on both sides, is cooled. Subsequently, floor boards with a glue-free profile are milled from the carrier board 1 veneered on both sides. In this case, the oak veneer side serves as the usable surface. In order to apply the oak veneer on the usable surface, which is exposed to light, an aliphatic PU prepolymer, which does not react or hardly reacts under the influence of light, in particular it does not change color or rather turn yellow, has been applied.

On account of the pressing of the veneered carrier board under a high pressure, as described above, the veneer is compressed while the binder simultaneously penetrates the veneer. This creates a veneered board that has a veneer surface that is particularly capable of bearing mechanical loads, in particular a veneer surface with increased compressive strength. In addition, the polyurethane, which is formed during pressing, is a water-resistant binder, so that the veneer, which is not water-resistant per se, is also made water-resistant on account of the binder that has penetrated therein at least in sections.

Exemplary Embodiment 2

Starting Materials:
    Veneer: Thickness: 0.8 mm
      Type: Oak
      This veneer is used on the upper face 2 of the carrier board 1.
    Binder: Aliphatic PU prepolymer in liquid form
      This binder is used between the upper face 2 of the carrier board 1 and the oak veneer. The binder is exposed to light after the veneered carrier board has been produced.
    Carrier board: Thickness: 10 mm
      Type: HDF (high-density fiberboard)
    Backing: Melamine resin-impregnated sheet of paper
Production of the Veneered Carrier Board:
    200 g/m$^2$ of liquid PU prepolymer based on aliphatic isocyanates is applied onto the carrier board 1, in this case a HDF board (format: 2800×2070×10 mm) using a spraying device. Optionally, an additive is applied, e.g. a dye. Then, the oak veneer is laid onto the polymer with the optionally applied additive. A sheet of paper impregnated with melamine resin is positioned on the rear face as the backing. The sheet of paper impregnated with melamine resin has a paper weight of 80 g/m$^2$ and a resin application of 120 wt. % relative to the paper weight. The stack of materials to be pressed consisting of the backing on the lower face 3 of the carrier board 1, the carrier board 1, and the veneer 4 on the upper face 2 of the carrier board 1 is pressed in an SC press. The pressing temperature is 180° C., the pressing pressure is set to 30 kg/cm$^2$ and the pressing time is 60 seconds. Then, the veneered carrier board 1 is left to cool. During the pressing time, the prepolymer is pressed into the veneer and often also into the surface of the carrier board on account of the pressing pressure, such that the curing prepolymer is also mechanically anchored there. At the same time, the pressing pressure compresses the veneer and thus densifies it. In addition, restoring forces in the veneer are reduced or eliminated.

After the prepolymer has cured and cooled, floor boards with a glue-free profile are milled therefrom. In this case, the oak veneer side serves as the usable surface. The increased use of binder here causes that the veneer is penetrated by the binder and is thus completely water-resistant. The backing can advantageously be pressed with the carrier board in one pressing process, because melamine also cures under the conditions selected for the pressing. Therefore, in contrast to exemplary embodiment 1, one pressing process is omitted here.

Of course, an additive or a mixture of additives, which produce particular properties in the product, can also be added to the prepolymer. This may, for example, be dyes, agents for increasing the conductivity, etc. However, according to the invention, the additive may also be applied between the veneer 4 and the binder 8, such that the additive can act close to the surface, since additives are generally used to create surface effects.

According to the invention, the veneered carrier board can be used in any application where veneered surfaces were used previously. Furthermore, the boards with the veneer surfaces may, of course, also be used for the production of wall or ceiling panels in addition to the production of floor panels. They can also be used to produce furniture.

Exemplary Embodiment 3

Starting Materials:
    Veneer: Thickness: 0.8 mm
      Type: Oak
      This veneer is used on the upper face 2 of the carrier board 1.
    Binder: Aliphatic PU prepolymer
      This binder is used between the upper face 2 of the carrier board 1 and the oak veneer. The binder is exposed to light after the veneered carrier board has been produced.
    Carrier board: Thickness: 10 mm
      Type: Fiberboard, comprising 48 wt. % wood fibers and 52 wt. % melamine resin, in each case relative to the total weight of the board.
    Binder: Aromatic PU prepolymer 678.05 Jowat
      The binder is applied between the lower face 3 of the carrier board and the birch veneer used as the backing.
    Veneer: Thickness: 1.05 mm
      Type: Birch
Production of the Veneered Carrier Board:
    The carrier board (i) according to exemplary embodiment 3 is veneered in the same manner as the veneered carrier board according to exemplary embodiment 1.
    Since the carrier board (i) used in exemplary embodiment 3 and also the binder are water-resistant, a water-resistant, veneered carrier board 1 is provided.

The invention claimed is:

1. A method for producing a veneered board, comprising the steps of:
    producing a stack of materials comprising: a carrier board having an upper surface and a lower surface, a binder layer having an upper surface and a lower surface wherein the lower surface is in direct contact with the upper surface of the carrier board, an additive material layer having an upper surface and a lower surface wherein the lower surface is in direct contact with the upper surface of the binder layer, an outer layer of veneer having an upper surface and a lower surface wherein the lower surface is in direct contact with the upper surface of the additive material layer, and an optional backing layer having an upper surface and a lower surface wherein the upper surface is in direct contact with the lower surface of the carrier board; and
    pressing the stack of materials for a period of time at a pressure and a temperature causing: the binder and additive material to penetrate into the veneer with the additive material remaining on the surface of the binder, the binder to optionally penetrate the carrier board, and the binder to subsequently cure, forming the veneered board;

wherein the binder is a polyurethane prepolymer;

wherein the additive material is selected from the group consisting of dye, flame retardant, ink, UV stabilizer, antibacterial agents, antifungal agents, antialgal agents, hydrophobizing agents, bleaching agents, stain, and mixtures thereof, wherein the additive material is insoluble in the binder or is not homogeneously soluble in the binder; and wherein the veneer is a sheet of real wood.

2. The method according to claim 1, wherein the polyurethane prepolymer is aliphatic and/or aromatic.

3. The method according to claim 1, wherein the additive material layer is provided as a particulate solid layer or as a liquid layer.

4. The method according to claim 1, wherein the binder layer is provided as a liquid layer.

5. The method according to claim 1, wherein the pressing temperature is between 100° C. and 240° C.

6. The method according to claim 1, wherein the pressing time is between 20 seconds and 60 seconds.

7. The method according to claim 1, wherein the pressing pressure is between 25 N/mm$^2$ and 50 N/mm$^2$.

8. The method according to claim 1, wherein the stack of materials is produced by: applying the additive material to the lower surface of the veneer with the lower surface of the veneer facing upwards, forming the additive material layer; applying the binder to the lower surface of the additive material layer with the lower surface of the additive material layer facing upwards, forming the binder layer; contacting the lower surface of the binder layer with the upper surface of the carrier board; and optionally contacting the lower surface of the carrier board with the upper surface of the optional backing layer.

9. The method according to claim 1, wherein the stack of materials is produced by: applying the binder to the upper surface of the carrier board, forming the binder layer; applying the additive material to the upper surface of the binder layer, forming the additive material layer; contacting the lower surface of the veneer with the upper surface of the additive material layer; and optionally contacting the lower surface of the carrier board with the upper surface of the optional backing layer.

10. A veneered board produced by the method of claim 1, wherein the optional backing layer is not present.

11. The veneered board according to claim 10, wherein the carrier board is a wood composite board.

12. A veneered board produced by the method of claim 1, wherein the optional backing layer is present.

\* \* \* \* \*